United States Patent
Witrisna et al.

(10) Patent No.: US 10,523,652 B2
(45) Date of Patent: Dec. 31, 2019

(54) SECURE IDENTITY SHARING USING A WEARABLE DEVICE

(71) Applicant: CA, Inc., Islandia, NY (US)

(72) Inventors: Andy N. Witrisna, Richmond (CA); Sascha Horst Preibisch, Richmond (CA)

(73) Assignee: CA, Inc., Islandia, NY (US)

(*) Notice: Subject to any disclaimer, the term of this patent is extended or adjusted under 35 U.S.C. 154(b) by 307 days.

(21) Appl. No.: 15/473,473

(22) Filed: Mar. 29, 2017

(65) Prior Publication Data

US 2018/0288030 A1  Oct. 4, 2018

(51) Int. Cl.
  *H04L 29/06* (2006.01)
  *H04W 12/06* (2009.01)
  *H04W 12/00* (2009.01)

(52) U.S. Cl.
  CPC ...... *H04L 63/0807* (2013.01); *H04L 63/0435* (2013.01); *H04L 63/0442* (2013.01); *H04L 63/0853* (2013.01); *H04W 12/003* (2019.01); *H04W 12/06* (2013.01); *H04W 12/0608* (2019.01)

(58) Field of Classification Search
  CPC ............. H04L 63/0807; H04L 63/0435; H04L 63/0442; H04L 63/0853; H04W 12/06; H04W 12/003; H04W 12/0608
  See application file for complete search history.

(56) References Cited

U.S. PATENT DOCUMENTS

| | | | | |
|---|---|---|---|---|
| 2013/0268766 | A1* | 10/2013 | Schrecker | G06F 21/34 713/185 |
| 2015/0127939 | A1* | 5/2015 | Mazandarany | H04L 9/32 713/168 |
| 2017/0330188 | A1* | 11/2017 | Canh | G06Q 20/385 |

(Continued)

OTHER PUBLICATIONS

Finnegan, Matthew, "Banking on wearables: Time for finance sector to take smart devices seriously?", TechWorld, Mar. 3, 2015, available online at <http://www.techworld.com/wearables/wearables-next-big-thing-in-banking-3599998/> (11 pages).

(Continued)

*Primary Examiner* — Ayoub Alata
(74) *Attorney, Agent, or Firm* — Alliance IP, LLC

(57) ABSTRACT

Aspects of the embodiments include performing, by a personal computing device, a secure handshake with a secure server accessible through an identity provider to log into the secure server. A temporary identity (TID) token can be received at the personal computing device a from an identity provider system over a telecommunications network. The TID token can be encrypted using a cryptographic key stored in a hardware storage element of the personal computing device. The encrypted TID token can be transmitted to a connected wearable device across a Bluetooth connection or other connection protocol. When a user wishes to log into a network location accessible through the identity provider, the wearable device can provide the encrypted TID token to the computing device. The personal computing device can decrypt the encrypted TID token and use the decrypted TID to access the network location.

13 Claims, 6 Drawing Sheets

(56) References Cited

U.S. PATENT DOCUMENTS

2019/0026722 A1* 1/2019 Wu .................. G06Q 20/327

OTHER PUBLICATIONS

Quach, Jimmy, "Wearable security: Authentication apps for Apple Watch," Easy Cloud Solutions, Aug. 10, 2015, available online at <https://easycloudsolutions.com/2015/08/10/wearable-security-authentication-apps-for-apple-watch/> (8 pages).
"Set up your device for automatic unlock," NEXUS Help, 2017 Google Video Tutorials, Available online at < https://support.google.com/nexus/answer/6093922?hl!en&ref_topic=6168852/> (4 pages).
"Introducing Knock 2.0: Faster, more secure, more useful," Knock Press, Apr. 22, 2015, available online at <http://www.knocktounlock.com/press/ > (2 pages).
"1Password" Press Releases, Agile Bits, Earliest Release Jun. 2014, available online at <https://blog.agilebits.com/press/> (5 pages).

* cited by examiner

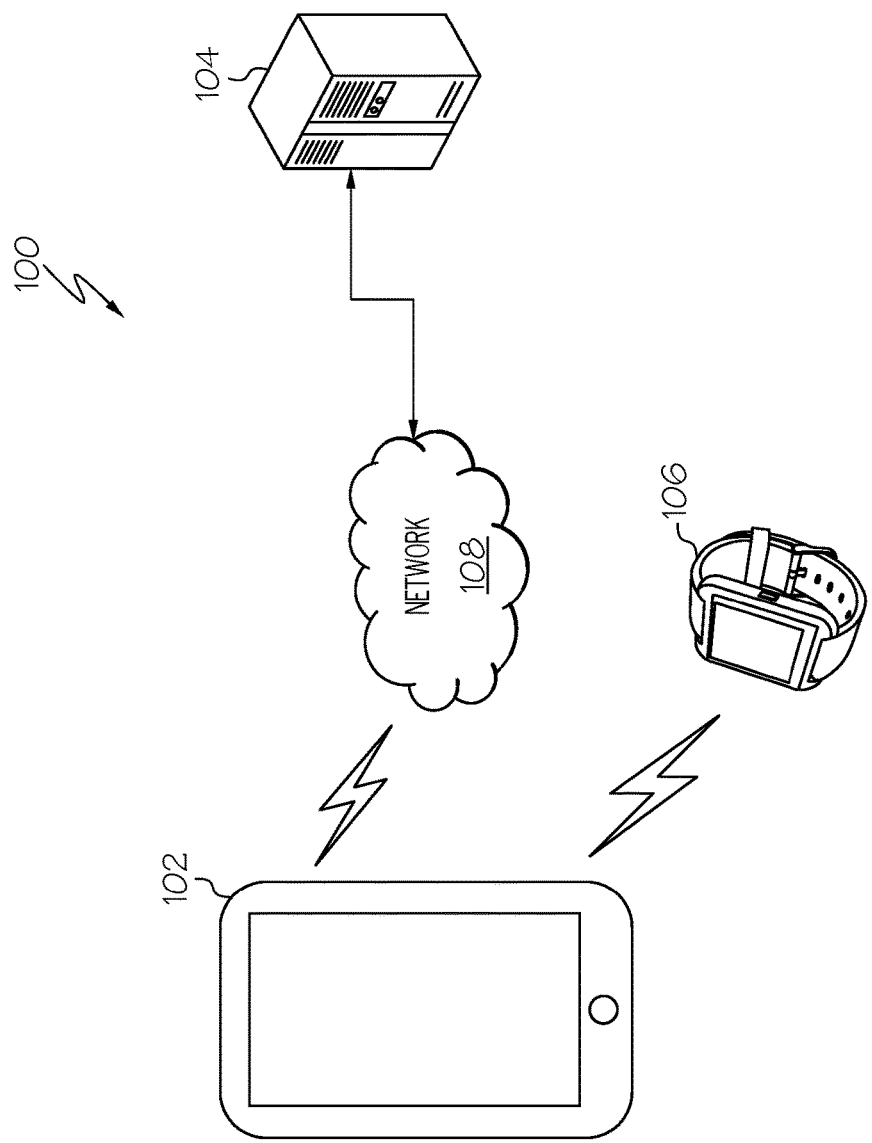

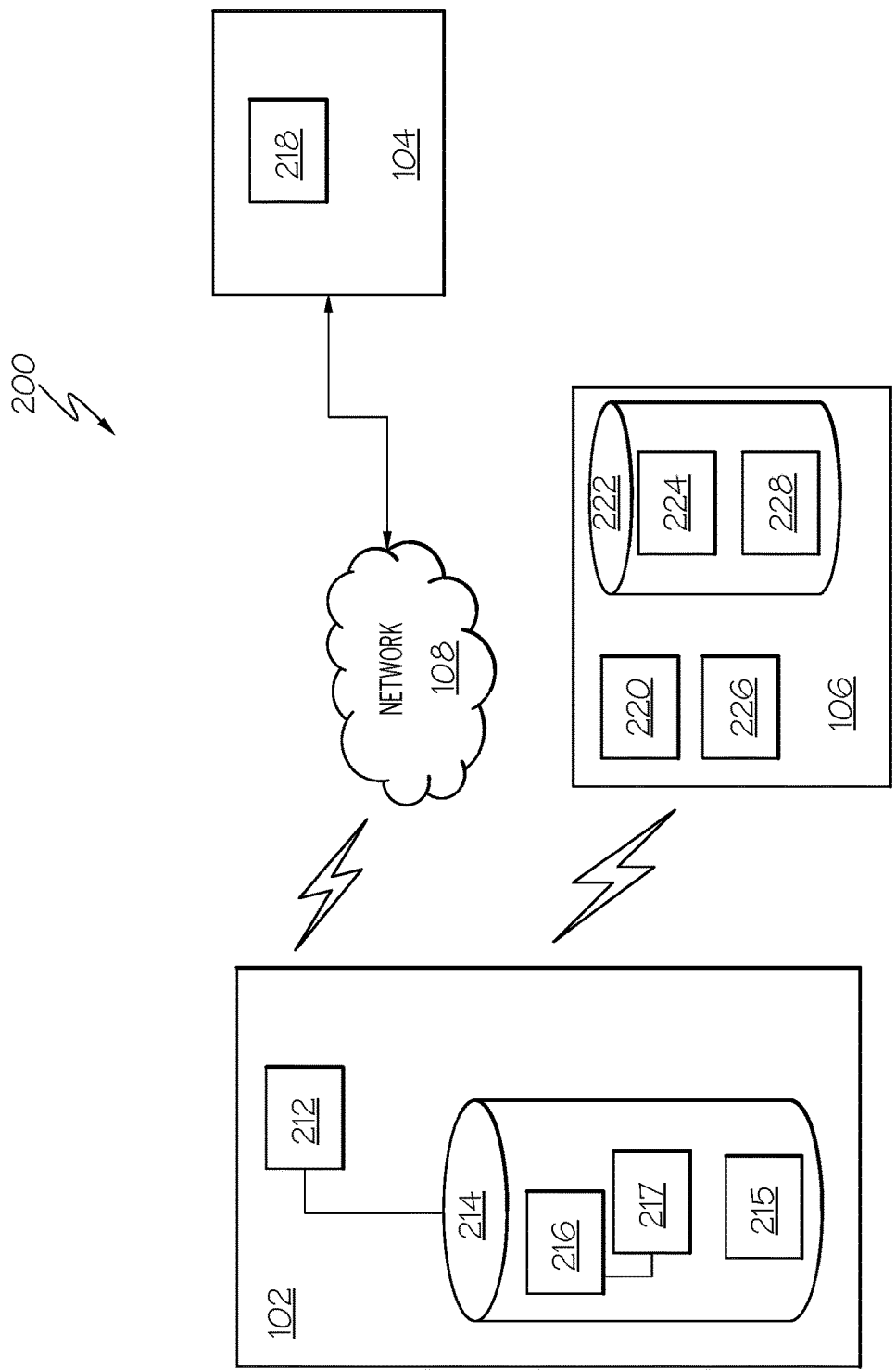

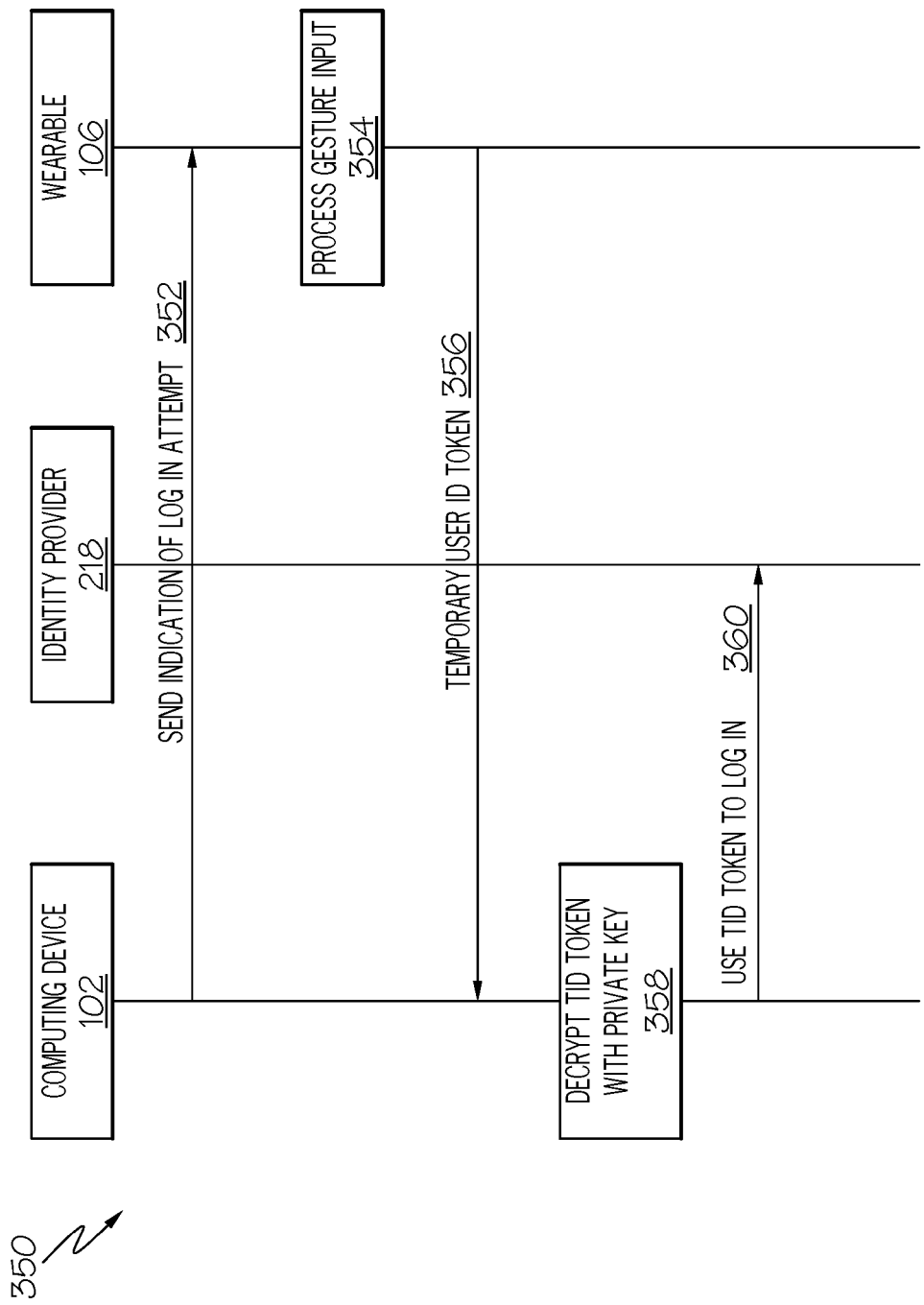

SECURE IDENTITY SHARING USING A WEARABLE DEVICE

TECHNICAL FIELD

This disclosure pertains to secure identity sharing using a wearable device, and more particularly, to using a wearable device to store identity information for access to secure remote network locations.

BACKGROUND

Mobile devices, tablet computer, and other computing devices can be used to access remote network locations. In order to secure the mobile device, a password or PIN can be configured. Many devices also include a fingerprint reader so that devices can be accessed conveniently by tapping a finger onto that reader. Many applications also require credentials that are different than the passcode or PIN or fingerprint. This means that device users may have to remember a PIN to access the device and credentials for one or more applications. Managing different credentials can be difficult. For that reason it is often an option to not configure device credentials. In that case devices can be used by anyone. Nevertheless apps usually do not provide this option. Especially enterprise apps are usually not accessible without credentials. Username, password, SSO token such as JSON Web Token (JWT) or SAML token are valid credentials.

SUMMARY

Aspects of the embodiments are directed to a computer implemented method. The method can include performing, by a personal computing device, a secure handshake with a secure server accessible through an identity provider to log into the secure server; receiving, at the personal computing device, a temporary identity token from an identity provider system over a telecommunications network; utilizing a cryptographic key stored in a hardware storage element of the personal computing device to encrypt the temporary identity token; identifying a wearable device paired to a personal computing device; and transmitting the encrypted temporary identity token to the paired wearable device.

Some embodiments can also include generating a public and private key pair upon receiving the temporary identity token; storing the private key in a hardware storage element; and wherein encrypting the temporary identity token comprises encrypting the temporary identity token using the generated public key.

Some embodiments can include making a request for a service from the identity provider; receiving the encrypted temporary identity token from the paired wearable device; decrypting the encrypted temporary identity token using a locally stored private key; and using the decrypted temporary identity token to securely authenticate the personal computing device with the identity provider.

Some embodiments can include deleting the decrypted temporary identity token after using the decrypted temporary identity token to access the identity provider.

Some embodiments can include synchronizing an application level interface for accessing the temporary identity token with the paired wearable device.

Some embodiments can include performing a secure login with the identity provider prior to receiving the temporary identity token.

Aspects of the embodiments are directed to a computer implemented method performed on a wearable device. The method can include receiving, from a connected device paired to the wearable device, an indication of an attempt to log in to a secure identity provider location from across a telecommunications network; identifying a temporary identity token associated with the secure identity provider; and transmitting the temporary identity token to the paired connected device.

In some embodiments, the temporary identity token is encrypted by a public key.

Some embodiments can include receiving the temporary identity token from the connected device; and storing the encrypted temporary identity token in a storage device on the wearable device.

Some embodiments can include receiving a gesture recognition signal from the wearable device; and transmitting the encrypted temporary identity token to the connected device based on the gesture recognition signal.

Some embodiments can include identifying the temporary identity token based on the gesture recognition signal and granting access to the encrypted temporary identity token based on the gesture recognition signal.

In some embodiments, the wearable device is connected to the connected device across a Bluetooth connection.

Aspects of the embodiments are directed to a system that includes a mobile device comprising a hardware processor and a memory for storing information including computer readable computer code, the mobile device configured to receive a temporary identity token from an identity provider from across a telecommunications network; encrypt the temporary identity token; and transmit the encrypted temporary identity token to a paired wearable device. The system can also include a wearable device communicatively coupled to the computing device, the wearable device comprising a hardware processor and a memory for storing information including computer readable computer code. The wearable device can be configured to store the encrypted temporary identity token in the memory of the wearable device.

In some embodiments, the mobile device is configured to establish a secure connection with a secure server accessible through the identity provider prior to receiving the temporary identity token; and wherein receiving the temporary identity token is based, at least in part, on establishing the secure connection with the secure server.

In some embodiments, the wearable device is configured to receive, from the mobile device, an indication that the mobile device is attempting to log into a secure server accessible through the identity provider; and transmit the stored encrypted temporary identity token to the mobile device.

In some embodiments, the mobile device is configured to receive, from the wearable device; the encrypted temporary identity token; decrypt the encrypted temporary identity token; and use the decrypted temporary identity token to access the secure server.

In some embodiments, the mobile device is configured to decrypt the encrypted temporary identity token using a private key stored in the memory of the mobile device.

In some embodiments, the mobile device is further configured to remove the decrypted temporary identity token after the mobile device has been provided access to the secure server.

In some embodiments, the wearable device is configured to recognize a gesture input, and transmit the stored encrypted temporary identity token based on the recognized gesture input.

In some embodiments, the mobile device is configured to encrypt the temporary identity token with a public key pair, and store a private key associated with the public key in the memory of the mobile device.

BRIEF DESCRIPTION OF THE DRAWINGS

FIG. 1 is a schematic diagram of a system that includes a personal computing device and a connected wearable device in accordance with embodiments of the present disclosure.

FIG. 2 is a schematic block diagram of a system that includes a personal computing device and a connected wearable device in accordance with embodiments of the present disclosure.

FIGS. 3A-3B are swim lane diagrams illustrating communication between a personal computing device and an identity provider managing a secure network location and the mobile device and a connected wearable device in accordance with embodiments of the present disclosure.

DETAILED DESCRIPTION

Figure 3A:
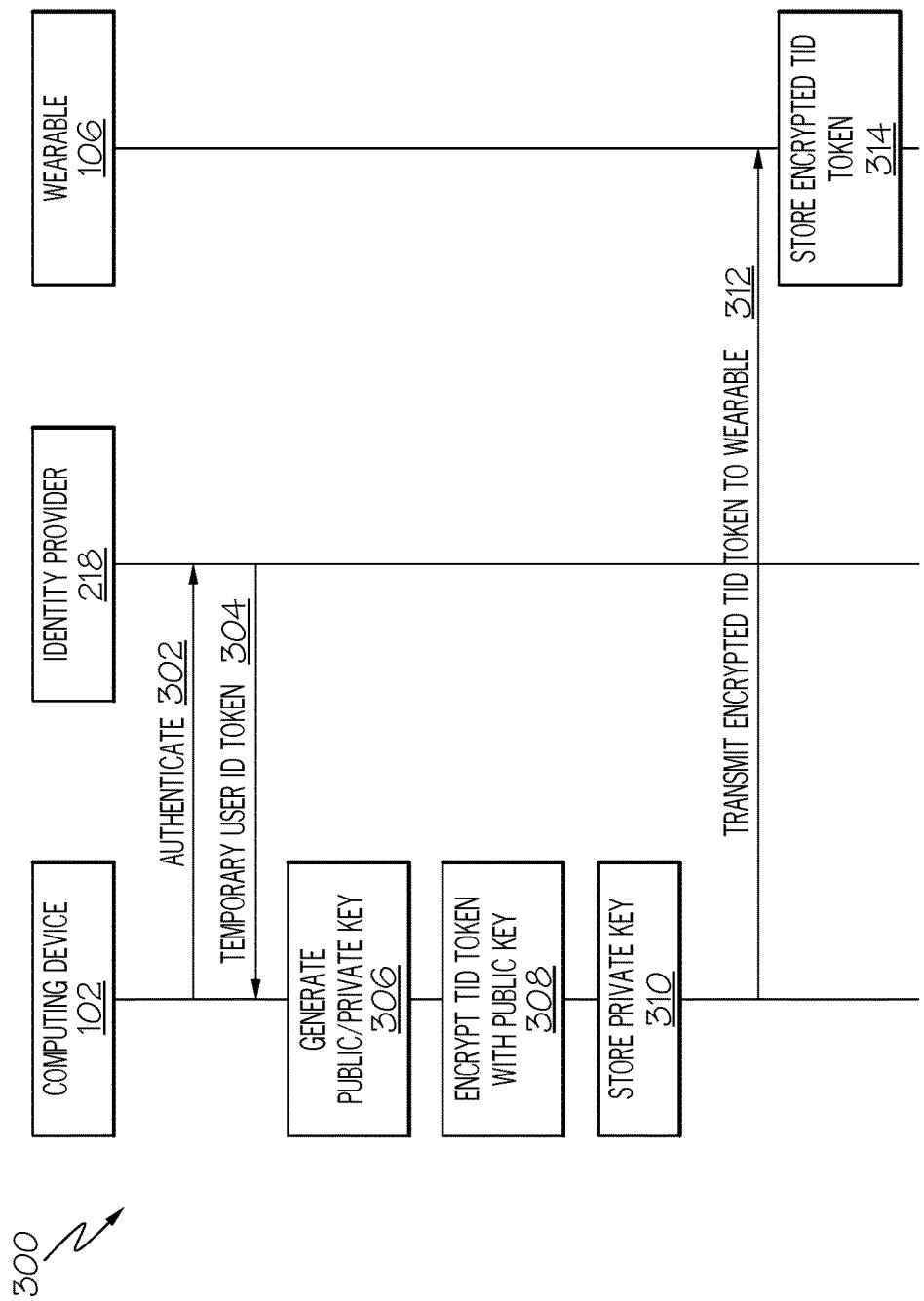

This disclosure describes using a connected wearable device as a container for a temporary identity token (TID), such as an SSO token. A mobile device can receive a TID from an identity provider managing a secured network location. The mobile device can encrypt the TID using an encryption key, such as a public/private key pair. The mobile device can store the private key locally and send the encrypted TID to a connected wearable device for storage. By doing so, the encrypted TID is stored in a separate physical location than the private key needed to decrypt the encrypted TID. This physical separate results in added security when accessing secured network locations from mobile devices.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," " module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a schematic diagram of a system 100 that includes a mobile device and a connected wearable device in accordance with embodiments of the present disclosure. System 100 includes a personal computing device 102. Personal computing device 102 can be a mobile device, tablet PC, laptop, or other type of personal computing device. The personal computing device 102 can be connected to a wearable device 106. Wearable device 106 can be smart watch, fitness tracker, keychain dongle, or other type of connected wearable device. The personal computing device 102 can be connected to the wearable device across a Bluetooth connection, near-field connection, or short range radio connection. The wearable device 106 can also be connected to the personal computing device 102 across a Wi-Fi connection, radio access network connection, internet connection, etc. The personal computing device 102 and the wearable device 106 can exchange data and control packets across their shared connection. For example, the personal computing device 102 and the connected wearable device 106 can exchange encrypted temporary identity tokens across a Bluetooth connection.

The personal computing device 102 can communicate with a remote network location 104 across a network 108. The remote network location 104 can be a secured network site, such as a website or network enterprise location. The personal computing device 102 can receive a temporary identity token from the secured remote location after a successful login attempt. The personal computing device 102 can retransmit the temporary identity token to the secured network location when attempting to log in again after some time period (and while the token is still valid).

FIG. 2 is a schematic block diagram of a system 100 that includes a personal computing device 102 and a connected wearable device 106 in accordance with embodiments of the present disclosure. The personal computing device 102 can include a processor 212 and a memory 214. Processor 212 can be a hardware processor that can execute instructions stored in memory. The processor 212 can be a programmable data processing apparatus that can be a mechanism for implementing the functions/acts specified in the flowchart and/or block diagram block or blocks through the execution of stored instructions and/or program code.

The memory 214 can be a hardware memory element that store program code that includes instructions that, when executed by the processor 212, can cause the personal computing device 102 to perform operations described herein.

The personal computing device 102 can connect to a remote network location 104 across a network 108, such as the internet or a virtual private connection. The remote network location 104 can be a server that provides network-based services to the personal computing device 102 across the network 108.

The personal computing device 102 can connect to the remote network location 104 through a secure log in. The remote network location 104 can be accessible through an identity provider 218. Identity provider 218 can provide identity information for accessing the remote network location 104. An identity provider 218 can be associated with the remote network location; or in embodiments, the identity provider 218 can be associated with a different remote network location, but can be used to provide identity information to log into a disparate remote network location. For example, some websites permit the use of log in credential for a social media site for accessing services. In this example, the social media site can be the identity provider for the remote network location.

The remote network location 108 can send a temporary identity (TID) token to the personal computing device 102 for accessing the remote network location for multiple sessions (such as in a single sign-on scenario). The personal computing device can store an encryption key 216, which can be a public/private key pair. The personal computing device 102 can encrypt the TID token with the encryption key 216 and store the private key 217 in the memory 214.

The personal computing device 102 can transmit the encrypted TID token to the wearable device 106 across a communications link, such as a Bluetooth connection. The wearable device 106 can include a processor 220 (that can be similar to processor 212) and a memory 222 (that can be similar to memory 214). The wearable device 106 can store the encrypted TID token 224 in the memory 222.

The wearable device 106 can include a gesture recognition element 226. A user of the wearable device 106 can perform a gesture that can be recognized by the gesture recognition element 226. Upon receiving and recognizing a gesture, in some embodiments, the wearable device 106 can retrieve a stored encrypted TID 224 and transmit the stored encrypted TID 224 to the personal computing device 102 via the communications link. The addition of a gesture as part of the encrypted TID token procedure adds further personalization and security to the system. Furthermore, a gesture can be programmed not only for each user, but for each identity provider, which further heightens security of the encrypted TID token.

Gesture recognition element 226 can by a gesture recognition system that is made up of hardware elements and software elements. For example, the gesture recognition system can include a gyroscope, accelerometer, inertial measurement unit (IMU), and/or other motion sensors. The gesture recognition system can also include software to program gesture recognition (e.g., receive a gesture and associate the gesture with a command, a profile, an identity, etc.) and to execute functionality based on a received and recognized gesture. In embodiments, gesture recognition element 226 can be part of a broader biometric system that can also use biometric readings to aid in identifying the user.

The personal computing device 102 can decrypt the received encrypted TID token using the private key 217. The personal computing device 102 can then use the decrypted TID token for signing onto the secured network location 104.

In embodiments, the personal computing device 102 can include an application 215 that can act as an interface to the secured network location 104 for logging into and accessing the network services. Similarly, the wearable device 106 can include an application 228 that can provide an interface with the application 215 on the personal computing device. The application 215 can be synchronized to the application 228. The application 228 can receive requests from the personal computing device 102 for encrypted TID tokens. The application 228 can also interface with the gesture recognition element 226 to receive gesture input signals to authorize transmission of encrypted TID tokens to the personal computing device. The application 228 can also access memory 222 to retrieve stored encrypted TID tokens for transmitting the encrypted TID tokens to the personal computing device 102.

Upon making an attempt to log into the secured network location 104 using the application 215 via the personal computing device 102, the application 215 can request the encrypted TID 224 from the wearable device 106, receive the encrypted TID 224, and decrypt the TID for sign on. Once signed on, the personal computing device 102 can remove the TID or can encrypt the TID and send the encrypted TID to the wearable device 106.

FIGS. 3A-3B are swim lane diagrams illustrating communication between a mobile device and an identity provider managing a secure network location and the mobile device and a connected wearable device in accordance with embodiments of the present disclosure. Starting with FIG. 3A, FIG. 3A is a swim lane diagram 300 showing the communication of a temporary identity token (TID) and storage on a wearable device 106.

The mobile/computing device can perform a secure handshake with an identity provider 104 to obtain access to services from the remote network location 104 through an identity provider 218 (302). The secure handshake can be initiated through an application level interface or browser that can connect to an identity provider secure server over a wired or wireless connection. The secure handshake can include receiving a temporary identity token from the identity provider 218 (304). In some implementations of the embodiments, a user can open an application on a mobile device and authenticates against an identity provider 218. That identity provider 218 issues an id_token or a SAML token (user—identity—token as of here) that represent the authenticated user.

The personal computing device can generate an encryption key for encrypting the receiving TID token from the identity provider 218 (306). Once the secure handshake is performed, the personal computing device 102 can encrypt the temporary identity token using the encrypting key (e.g., the public key of a public/private encryption key pair) (308). The personal computing device can store the private key locally on a memory (310). The mobile/computing device can transmit the encrypted temporary identity token(s) to the wearable 106 for storage (312). The wearable device can then store the encrypted TID token (314). In some implementations of the embodiments, the personal computing device 102 uses a public key to encrypt that token and pushes it onto the wearable device 106.

The encrypted TID token (e.g., an SSO token) can be stored on the wearable device 106 securely. Securing the encrypted TID token provides a faster and safer way to sign into a remote network location, e.g., through an application on the personal computing device. The wearable device 106 can maintain a list of users—identity—token but is not able to use them without the personal computing device because the personal computing device holds locally the private key for decrypting the encrypted TID token.

In embodiments, and at any point prior to step 312 in FIG. 3A, the personal computing device 106 can establish a connection (e.g., Bluetooth connection) with a wearable device 106. The personal computing device 102 can launch an application, and in some embodiments, synchronize the application with the wearable device 106. The application 215 can connect with the application 228 to transmit and retrieve the encrypted TID token.

Turning to FIG. 3B, FIG. 3B is a swim lane diagram 350 for exchanging an identity token in accordance with embodiments of the present disclosure. The next time the user makes an attempt to access the remote network location (e.g., using the application interface) that requires authentication, the personal computing device 102 sends an indication of a retrieval of the encrypted TID token to the wearable device 106 (352). The wearable device 106 can transmit the encrypted TID token to the personal computing device (356). The personal computing device 102 can decrypt the encrypted TID token using e.g., a private key stored locally in memory (358). The personal computing device can then forward the decrypted TID token to the identity provider 218 for accessing the remote network location (360).

If and when the personal computing device 102 attempts to reconnect with the identity provider 218, the wearable device 106 can transmit the encrypted temporary identity token(s) to the mobile/computing device (e.g., through synchronized applications running on the personal computing device 102 and the wearable device 106). The personal computing device 102 can decrypt the temporary identity token and use the decrypted temporary identity token to connect with the identity provider 218 (e.g., to access services provided by the remote network location 104). The storage of encrypted temporary identity token(s) on the wearable device 106 and the storage of the private key on the personal computing device 102 ensures a secure physical separation between the encrypted temporary identity token and the decryption keys. So, if the personal computing device 102 is lost or stolen, access to the identity provider using the identity token will not be possible since the identity token(s) are stored on the wearable device 106. If the wearable device is lost or stolen, then access to the identity provider 218 is also impossible through the wearable device 106, since the decryption keys are stored on the personal computing device 102.

The wearable device 106 can be programmed with a gesture recognition module that can trigger a transmission of the encrypted temporary identity token to the mobile/computing device. The use of a gesture adds another level of security. The gesture can be customizable for the user. Additionally, the gesture can be different for different identity providers. For example, a banking app can be provide an interface for programming a smartwatch with a first gesture; and a social media app can offer another interface for programming a smartwatch with a second gesture. By allowing for customizable gestures, further levels of security can be facilitated.

The personal computing device does not reuse user credentials and does not persist user credential within the personal computing device. This disclosure uses secure technologies that are available for personal computing devices (and specifically for mobile devices), such as private key/public key pairs, to encrypt/decrypt the TID token. The wearable as a container is able to maintain multiple user—identity—token but is not able to misuse them. The TID tokens are only usable by the app (or group of apps), that has access to the private key whose public key was used to encrypt the token.

Once the user—identity—token has been retrieved by the mobile device to log in to a remote network location (e.g., through an application), that token will be removed from that personal computing device. If the mobile device gets stolen there is no way to log in to the app without the wearable device. On the other side, if the wearable device gets stolen the encrypted user—identity—token is of no use due to the token being encrypted.

When accessing the enterprise app in public, e.g. in the Skytrain or coffee shop, the user is not required to provide username/password in front of people. Logging in to the app happens "automagically": the app retrieves the encrypted user—identity—token, decrypts it, and uses it to log the user into the secured remote network location.

Figure 4:
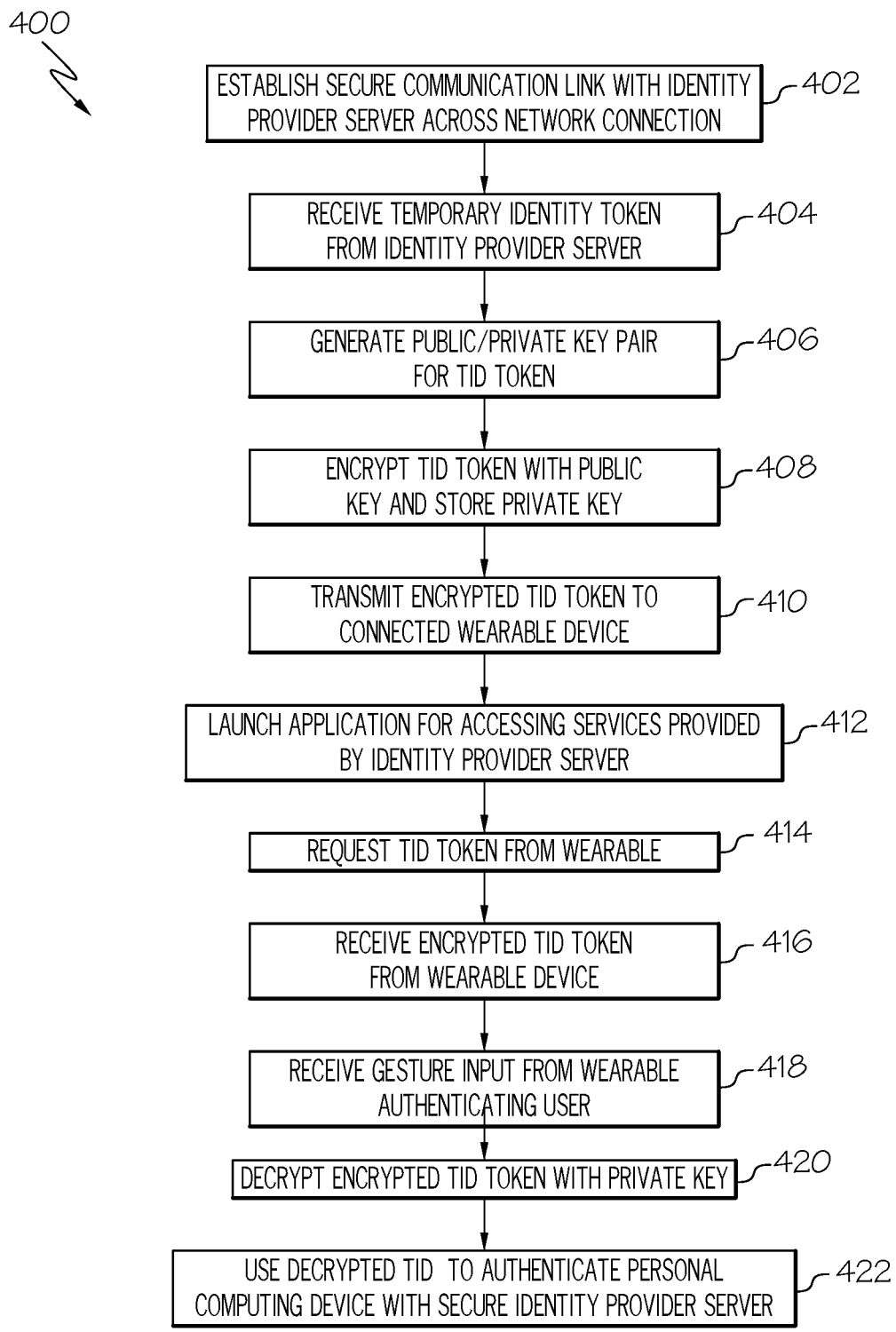
FIG. 4 is a process flow diagram for a personal computing device to secure a temporary identity token with a connected wearable device in accordance with embodiments of the present disclosure.

FIG. 4 is a process flow diagram 400 for a mobile device to secure a temporary identity token with a connected wearable device in accordance with embodiments of the present disclosure. The personal computing device can establish a secure communication link with identity provider server across network connection (402). The personal computing device can receive temporary identity token from identity provider server (404). The personal computing device can generate an encryption key (e.g., a public/private key pair) for encrypting the TID token (406). The personal computing device can encrypt TID token with public key and store private key (408). The personal computing device can transmit encrypted TID token to connected wearable device (410). The personal computing device can launch application for accessing services provided by identity provider server (412). The personal computing device can request a TID token from wearable (414). The personal computing device can receive, from a wearable device, the encrypted TID token (416). In embodiments, the personal computing device can also receive a gesture input signal from the wearable device (418). The gesture recognition input signal can be used by the personal computing device to authenticate the wearer, as an added level of security. In embodiments, the application on the personal computing device can wait for the gesture recognition input signal before decrypting the encrypted TID token. In embodiments, the personal computing device can decrypt the encrypted TID token without the gesture recognition input signal. The personal computing device can decrypt wearable with private key (420). The personal computing device can forward the received decrypted TID token to the identity provider to access a secured network location accessible through the identity provider server (422).

Figure 5:
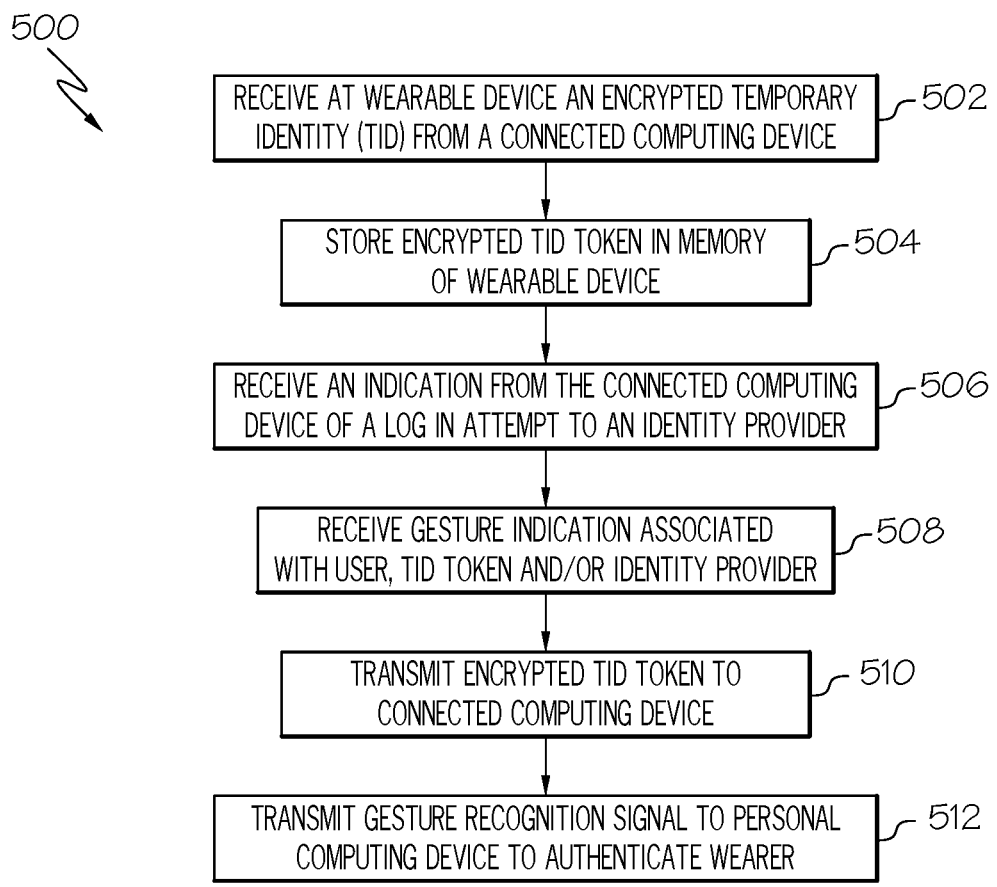
FIG. 5 is a process flow diagram for a wearable device to provide an encrypted temporary identity token to a connected personal computing device in accordance with embodiments of the present disclosure.

FIG. 5 is a process flow diagram 500 for a wearable device to provide an encrypted temporary identity token to a connected mobile device in accordance with embodiments of the present disclosure. The wearable device can receive at wearable device an encrypted temporary identity (TID) token from a connected computing device (502). The wearable device can store the encrypted TID token in memory of wearable device (504). The wearable device can receive an indication from the connected computing device of a log in attempt to an identity provider (506). The wearable device can receive gesture indication associated with the user, the TID token, and/or identity provider (508). The wearable device can transmit the encrypted TID token to connected computing device (510). In embodiments, the wearable device can transmit a gesture recognition input signal to the personal computing device to authenticate the wearer's identity and to prompt the personal computing device to decrypt the encrypted TID token sent to the personal computing device by the wearable device (512).

In embodiments, the identity provider can be any service provider that requires a secure login for access to remote services. One example includes a bank that offers online banking services through a browser or application-level interface (i.e., an app). Another example includes a social media service, an online retailer, credit card company, etc.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer implemented method comprising:
   performing, by a personal computing device, a secure handshake with a secure server accessible through an identity provider to log into the secure server;
   receiving, at the personal computing device, a temporary identity token from an identity provider system over a telecommunications network;
   utilizing a cryptographic key stored in a hardware storage element of the personal computing device to encrypt the temporary identity token;

identifying a wearable device paired to a personal computing device;
transmitting the encrypted temporary identity token to the paired wearable device;
making a request, by the personal computing device, for a service from the identity provider;
in response to making the request for the service, receiving, by the personal computing device, the encrypted temporary identity token and a gesture signal from the paired wearable device, wherein the gesture signal, at least in part, causes the personal computing device to authenticate an identity of a wearer of the wearable device, and decrypt the encrypted temporary token;
in response to receiving by the personal computing device, the encrypted token and the gesture signal, authenticating the identity of the wearer of the wearable device, and decrypting the encrypted temporary identity token using a locally stored private key; and
transmitting, to the identity provider, the decrypted temporary identity token to authenticate the personal computing device; and
accessing the service by the personal computing device based on the temporary identity token.

2. The computer implemented method of claim 1, further comprising:
generating a public and private key pair upon receiving the temporary identity token;
storing the private key in a hardware storage element; and wherein
encrypting the temporary identity token comprises encrypting the temporary identity token using the generated public key.

3. The computer implemented method of claim 1, further comprising deleting the decrypted temporary identity token after using the decrypted temporary identity token to access the identity provider.

4. The computer implemented method of claim 1, further comprising synchronizing an application level interface for accessing the encrypted temporary identity token with the paired wearable device.

5. The computer implemented method of claim 1, further comprising performing a secure login with the identity provider prior to receiving the temporary identity token from the identity provider.

6. A computer implemented method performed on a wearable device, the method comprising:
receiving, from a connected device paired to the wearable device, an encrypted temporary identity token, wherein the encrypted temporary identity token is encrypted with a cryptographic key stored on a memory of the connected device;
storing the encrypted temporary identity token with a plurality of encrypted temporary identity tokens in a memory of the wearable device, wherein the plurality of the encrypted temporary identity tokens are related to a plurality of identity providers;
receiving, from the connected device, an indication of an attempt to log in to a secure server accessible through an identity provider location from across a telecommunications network;
receiving a gesture input signal from a wearer of the wearable device;
identifying the encrypted temporary identity token associated with the secure server accessible through the identity provider based at least in part on the gesture input signal;
transmitting the encrypted temporary identity token to the paired connected device; and
transmitting a gesture recognition signal associated with the gesture input signal to the paired connected device, wherein the gesture recognition signal is used by the paired connected device to authenticate an identity of the wearer of the wearable device and to decrypt the encrypted temporary identity token.

7. The computer implemented method of claim 6, wherein the temporary identity token is encrypted by a public key.

8. The computer implemented method of claim 6, wherein the wearable device is connected to the connected device across a Bluetooth connection.

9. A system comprising:
a mobile device comprising a hardware processor and a memory for storing information including computer readable computer code, the mobile device configured to:
receive a temporary identity token from an identity provider from across a telecommunications network;
encrypt the temporary identity token; and
transmit the encrypted temporary identity token to a paired wearable device;
and
a wearable device communicatively coupled to the mobile device, the wearable device comprising a hardware processor and a memory for storing information including computer readable computer code, the wearable device configured to:
store the encrypted temporary identity token in the memory of the wearable device;
receive, from the mobile device, an indication that the mobile device is attempting to log into a secure server accessible through the identity provider;
receive a gesture input signal from a wearer of the wearable device;
recognize the gesture input signal to retrieve the stored encrypted temporary identity token;
identify an identity of the wearer of the wearable device based at least in part on the gesture input signal;
transmit the stored encrypted temporary identity token and a gesture signal based on the recognized gesture input signal to the mobile device;
wherein the gesture signal enables the mobile device to authenticate the wearer of the wearable device, and decrypt the encrypted temporary identity token; and
the mobile device to:
in response to receiving the encrypted temporary identity token and the gesture signal, authenticating the identity of the wearer of the wearable device, decrypting the encrypted temporary identity token using a locally stored private key;
transmit the decrypted temporary identity token to authenticate the mobile device with the identity provider; and
access the secure server based on the temporary identity token.

10. The system of claim 9, wherein the mobile device is configured to:
establish a secure connection with a secure server accessible through the identity provider prior to receiving the temporary identity token; and
wherein receiving the temporary identity token is based, at least in part, on establishing the secure connection with the secure server.

11. The system of claim 9, wherein the mobile device is configured to decrypt the encrypted temporary identity token using a private key stored in the memory of the mobile device.

12. The system of claim 9, wherein the mobile device is further configured to remove the decrypted temporary identity token after the mobile device has been provided access to the secure server.

13. The system of claim 9, wherein the mobile device is configured to encrypt the temporary identity token with a public key pair, and store a private key associated with the public key in the memory of the mobile device.

* * * * *